United States Patent [19]

Dreyfuss et al.

[11] 3,984,530

[45] Oct. 5, 1976

[54] METHANE-METHANOL CYCLE FOR THE THERMOCHEMICAL PRODUCTION OF HYDROGEN

[75] Inventors: Robert M. Dreyfuss, Mount Vernon, N.Y.; Robert G. Hickman, Livermore, Calif.

[73] Assignee: The United States of America as represented by the United States Energy Research and Development Administration, Washington, D.C.

[22] Filed: June 26, 1975

[21] Appl. No.: 590,748

[52] U.S. Cl. .................... 423/650; 423/579; 423/648; 423/544; 423/653; 423/622

[51] Int. Cl.[2] .................... C01B 1/16; C01B 1/18; C01B 1/26; C01B 13/02

[58] Field of Search .......... 423/648, 544, 622, 650, 423/579, 653

[56] References Cited

UNITED STATES PATENTS

| | | | |
|---|---|---|---|
| 1,863,681 | 6/1932 | Al | 423/653 |
| 2,998,303 | 8/1961 | Huebler | 423/648 |
| 3,244,513 | 4/1966 | Zubryckyj et al. | 423/544 X |
| 3,527,565 | 9/1970 | Banchik | 423/653 |
| 3,867,145 | 2/1975 | Honjo et al. | 423/622 X |

OTHER PUBLICATIONS

"Encyclopedia of Chemical Reactions", C. A. Jacobon, vol. 2, 1948, pp. 283 and 322, Reinhold Pub. Co., N.Y.

"Comprehensive Inorganic Chemistry", vol. 3, 1973, J. C. Bailar, Jr. et al. Pergamon Press, Oxford.

"Chemistry of Carbon Compounds", vol. 1, Part A, 1951, E. H. Rodd, p. 297, Elsevier Pub. Co., N.Y.

*Primary Examiner*—Edward Stern

*Attorney, Agent, or Firm*—Dean E. Carlson; Irene S. Croft; James M. Hanley

[57] ABSTRACT

A thermochemical reaction cycle for the generation of hydrogen from water comprising the following sequence of reactions wherein M represents a metal:

$$CH_4 + H_2O \rightarrow CO + 3H_2 \quad (1)$$

$$CO + 2H_2 \rightarrow CH_3OH \quad (2)$$

$$CH_3OH + SO_2 + MO \rightarrow MSO_4 + CH_4 \quad (3)$$

$$MSO_4 \rightarrow MO + SO_2 + 1/2O_2 \quad (4)$$

The net reaction is the decomposition of water into hydrogen and oxygen.

4 Claims, No Drawings

METHANE-METHANOL CYCLE FOR THE THERMOCHEMICAL PRODUCTION OF HYDROGEN

BACKGROUND OF THE INVENTION

The invention described herein was made in the course of, or under, Energy Research and Development Administration Contract No. W-7405-ENG-48 with University of California.

This invention relates to a thermochemical reaction cycle for the generation of hydrogen from water, more particularly, to a thermochemical reaction cycle utilizing methane and methanol as intermediates.

The potential use of hydrogen as a non-polluting energy source is well known. However, for hydrogen ever to achieve large scale use, there must be large scale production. The main problem is finding thermodynamically efficient methods for producing cheap hydrogen. The most obvious method, electrolysis of water, is relatively inefficient when one considers that the method is primarily dependent upon and limited by the efficiency of generating the electrical energy for the electrolysis. Direct thermal cracking of gaseous water using nuclear heat has been virtually discarded for thermodynamic reasons. No appreciable yields are possible under 2500°C, and present conventional reactors are not able to provide such temperatures during normal operation.

Multistep processes for the production of hydrogen from water have been suggested. If suitable reagents for a sequence can be found, it is possible to minimize the work requirement and chemically produce hydrogen and oxygen from water without electrolysis. The difficulty is finding a suitable set of reagents.

One reaction sequence, based on calcium, bromine and mercury compounds, has recently been proposed for the production of hydrogen and oxygen from water at temperatures under 730°C. (See "Hydrogen Fuel Use Calls for New Source", *Chemical and Engineering News*, July 3, 1972, pp. 16–18.) The process consumes none of the materials required for the sequence; the net reaction is simply decomposition of water. However, one of the major problems associated with this reaction sequence is the formation of such compounds as HBr, the extremely corrosive effects of which at high temperatures and pressures are well known.

Other reaction sequences utilize, as an intermediate, a metalloidal element from Group V or Group VI of the periodic system and compounds thereof. Such sequences are described in the copending application of Oscar H. Krikorian, Ser. No. 481,263, filed June 20, 1974, for "Thermochemical Production of Hydrogen", now U.S. Pat. No. 3,928,549, issued Dec. 23, 1975, and the copending application of Robert M. Dreyfuss, Ser. No. 590,749 for "Thermochemical Production of Hydrogen", filed concurrently herewith.

SUMMARY OF THE INVENTION

The present invention relates to a reaction cycle for the thermochemical production of hydrogen from water utilizing a methane-methanol reaction sequene.

The present cycle is based on the reaction of methane and water to produce carbon monoxide and hydrogen which are then reacted to produce methanol, as in the standard industrial synthesis of methanol. The amount of hydrogen produced in the reaction of methane and water is in excess of the amount required to convert carbon monoxide to methanol. This excess hydrogen is the product hydrogen in the present process. In order to complete the process cycle it is necessary to regenerate methane from product methanol by means of reactants which are themselves regenerable.

It has now been found that such regeneration can be accomplished by reducing the methanol with a metal oxide and sulfur dioxide to produce the corresponding metal sulfate and regenerate methane. The metal sulfate is then thermally decomposed to regenerate the metal oxide and sulfur dioxide and produce oxygen. Thus, the net reaction is the decomposition of water into hydrogen and oxygen.

It is, therefore, among the objects of this invention to provide a thermochemical reaction cycle for the generation of hydrogen from water.

More specifically, it is an object of the present invention to provide a methane-methanol reaction cycle for the production of hydrogen wherein the net reaction is the decomposition of water into hydrogen and oxygen.

DETAILED DESCRIPTION OF THE INVENTION

Broadly, the process of the present invention can be represented by the following sequence of reactions wherein M represents a suitable metal.

$$CH_4 + H_2O \rightarrow CO + 3H_2 \qquad (1)$$

$$CO + 2H_2 \rightarrow CH_3OH \qquad (2)\ (2)$$

$$CH_3OH + SO_2 + MO \rightarrow MSO_4 + CH_4 \qquad (3)$$

$$MSO_4 \rightarrow MO + SO_2 + 1/2O_2 \qquad (4)$$

The net reaction of the cycle is the decomposition of water into hydrogen and oxygen. The most suitable metal oxides for use in the present invention are the oxides of those metals whose sulfates are readily thermally decomposable, preferably at a temperature of less than substantially 1200°K, most suitably at a temperature of less than substantially 1000°K. Thus, the most suitable metal oxides are the oxides of Al, Cu, Mn, Sn, Ni, Co, and related cations.

The process of the present invention is illustrated by the following sequence of reactions in which zinc oxide is the representative metal oxide.

EXAMPLE

| | $\Delta H^\circ_{298}$ (kJ/mol) | |
|---|---|---|
| $CH_4 + H_2O \rightarrow CO + 3H_2$ (~ 975°K, Nickel catalyst) | +247 | (5) |
| $CO + 2H_2 \rightarrow CH_3OH$ (~ 500°K, Zinc-Copper chromite catalyst) | −92 | (6) |
| $CH_3OH + SO_2 + ZnO \rightarrow ZnSO_4 + CH_4$ (~ 600°K) | −209 | (7) |
| $ZnSO_4 \rightarrow ZnO + SO_2 + 1/2O_2$ (~ 1000°K) | +340 | (8) |
| $H_2O \rightarrow H_2 + 1/2O_2$ | | |

The reaction products obtained in the above cycle are readily separable by means of conventional separation techniques familiar to those skilled in the art. For example, hydrogen can be separated from carbon monoxide by adsorption on a suitable surface or by permeation through a palladium membrane, one-third of the hydrogen being removed as product and the remainder being reacted with the carbon monoxide to provide methanol. Sulfur dioxide and oxygen can be separated by conventional gas chromatographic techniques.

The efficiency for the above cycle, given by the decomposition enthalpy of water ($\Delta H^\circ_{298} = 286$ kJ/mol) divided by the sum of the enthalpies for the two endothermic high temperature steps, reactions 5) and (8), is 49%.

Similar process cycles can be set up using oxides of Al, Cu, Mn, Sn, Ni, Co, and related cations.

Closed process cycles, such as those of the present invention are decidedly advantageous from an economic and environmental standpoint, by-products of the reaction are recycled for re-use so that raw materials are not wasted, and no waste materials are produced to pollute the environment. Other advantages of the present closed cycle process include low operational temperatures (below about 1000°–1200°K) and avoidance of corrosive and extremely toxic substances.

Although the invention has been described in detail with respect to specific examples, it will be appreciated that various changes and modifications can be made by those skilled in the art within the scope of the invention as expressed in the following claims.

What we claim is:

1. A thermochemical process cycle for the production of hydrogen from water comprising the steps of:

a. reacting methane with water under conditions to produce carbon monoxide and hydrogen, the amount of hydrogen produced being in excess of that required to convert the carbon monoxide to methanol;

b. recovering the excess hydrogen as product hydrogen;

c. reacting the remaining hydrogen with the carbon monoxide under conditions to produce methanol;

d. reacting the methanol with a metal oxide and sulfur dioxide under conditions to produce the corresponding metal sulfate and regenerate methane;

e. thermally decomposing the metal sulfate under conditions to regenerate the metal oxide and sulfur dioxide and to product oxygen;

f. recycling regenerated methane from step (d) to step (a); and g. recycling regenerated metal oxide and sulfur dioxide from step (e) to step (d).

2. A process cycle according to claim 1 wherein the metal oxide is an oxide of a metal the sulfate of which is thermally decomposable at a temperature below substantially 1200°K.

3. A process cycle according to claim 2 wherein the metal oxide is zinc oxide.

4. A process cycle according to claim 1 wherein the temperature of operation of the cycle is below about 1200°K.

* * * * *